United States Patent
Islam et al.

(10) Patent No.: US 12,236,134 B2
(45) Date of Patent: Feb. 25, 2025

(54) BANK-LEVEL PARALLELISM FOR PROCESSING IN MEMORY

(71) Applicant: Advanced Micro Devices, Inc., Santa Clara, CA (US)

(72) Inventors: Mahzabeen Islam, Dripping Springs, TX (US); Shaizeen Dilawarhusen Aga, Sunnyvale, CA (US); Johnathan Robert Alsop, Seattle, WA (US); Mohamed Assem Abd ElMohsen Ibrahim, Santa Clara, CA (US); Nuwan S Jayasena, Cupertino, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/953,723

(22) Filed: Sep. 27, 2022

(65) Prior Publication Data
US 2024/0103763 A1 Mar. 28, 2024

(51) Int. Cl.
*G06F 3/06* (2006.01)
(52) U.S. Cl.
CPC .......... *G06F 3/0659* (2013.01); *G06F 3/0611* (2013.01); *G06F 3/0673* (2013.01)
(58) Field of Classification Search
CPC ..... G06F 3/0659; G06F 3/0611; G06F 3/0673
See application file for complete search history.

(56) References Cited

U.S. PATENT DOCUMENTS

| 5,101,485 A | 3/1992 | Perazzoli, Jr. |
| 6,694,400 B1 | 2/2004 | Lai et al. |
| 9,836,232 B1 | 12/2017 | Vasquez et al. |

(Continued)

FOREIGN PATENT DOCUMENTS

WO    2024072862 A1    4/2024

OTHER PUBLICATIONS

Aga, Shaizeen, et al., "Co-ML: a Case for Collaborative ML Acceleration using Near-data Processing", Proceedings of the International Symposium on Memory Systems [retrieved May 27, 2022]. Retrieved from the Internet <https://doi.brg/10.1145/3357526.3357532>, Sep. 30, 2019, 12 pages.

(Continued)

*Primary Examiner* — Gurtej Bansal
(74) *Attorney, Agent, or Firm* — FIG. 1 Patents

(57) ABSTRACT

In accordance with the described techniques for bank-level parallelism for processing in memory, a plurality of commands are received for execution by a processing in memory component embedded in a memory. The memory includes a first bank and a second bank. The plurality of commands include a first stream of commands which cause the processing in memory component to perform operations that access the first bank and a second stream of commands which cause the processing in memory component to perform operations that access the second bank. A next row of the first bank that is to be accessed by the processing in memory component is identified. Further, a precharge command is scheduled to close a first row of the first bank and an activate command is scheduled to open the next row of the first bank in parallel with execution of the second stream of commands.

20 Claims, 5 Drawing Sheets

(56) References Cited

U.S. PATENT DOCUMENTS

| | | | |
|---|---|---|---|
| 9,892,803 B2 | 2/2018 | Reed | |
| 10,768,859 B1 * | 9/2020 | Kim | G06F 13/1642 |
| 10,891,228 B2 | 1/2021 | Steinmacher-Burow | |
| 12,026,401 B2 | 7/2024 | Madan et al. | |
| 12,066,950 B2 | 8/2024 | Madan et al. | |
| 2007/0249503 A1 | 10/2007 | Ariyur et al. | |
| 2011/0161784 A1 | 6/2011 | Selinger et al. | |
| 2012/0069034 A1 | 3/2012 | Biswas et al. | |
| 2014/0068203 A1 | 3/2014 | Son et al. | |
| 2014/0325148 A1 | 10/2014 | Choi et al. | |
| 2014/0365719 A1 | 12/2014 | Kuzmin et al. | |
| 2015/0187043 A1 | 7/2015 | Shebanow et al. | |
| 2016/0246713 A1 | 8/2016 | Choi et al. | |
| 2017/0300422 A1 | 10/2017 | Szubbocsev | |
| 2018/0188970 A1 | 7/2018 | Liu et al. | |
| 2019/0034097 A1 | 1/2019 | Chang et al. | |
| 2019/0065115 A1 | 2/2019 | Kwon et al. | |
| 2019/0079678 A1 | 3/2019 | Malladi et al. | |
| 2019/0392886 A1 | 12/2019 | Cox et al. | |
| 2020/0050397 A1 | 2/2020 | Meyerowitz et al. | |
| 2020/0073753 A1 | 3/2020 | Kim | |
| 2020/0174749 A1 * | 6/2020 | Kang | G06N 3/08 |
| 2020/0294558 A1 | 9/2020 | Yu et al. | |
| 2020/0356305 A1 | 11/2020 | Kim et al. | |
| 2021/0110876 A1 | 4/2021 | Seo et al. | |
| 2021/0150311 A1 | 5/2021 | Zhou et al. | |
| 2021/0182190 A1 | 6/2021 | Gao et al. | |
| 2021/0271599 A1 | 9/2021 | Sharovar | |
| 2021/0311634 A1 | 10/2021 | Chang et al. | |
| 2021/0382828 A1 | 12/2021 | Li | |
| 2022/0019360 A1 | 1/2022 | La Fratta et al. | |
| 2022/0076717 A1 | 3/2022 | Mathew et al. | |
| 2022/0121398 A1 | 4/2022 | Nale et al. | |
| 2022/0164251 A1 | 5/2022 | He et al. | |
| 2022/0164297 A1 * | 5/2022 | Sity | G06F 12/0802 |
| 2022/0206855 A1 | 6/2022 | Challapalle et al. | |
| 2022/0229575 A1 | 7/2022 | Chen et al. | |
| 2022/0253247 A1 | 8/2022 | Kim et al. | |
| 2022/0253248 A1 | 8/2022 | Yoon et al. | |
| 2022/0283719 A1 | 9/2022 | Eyerman et al. | |
| 2022/0292033 A1 | 9/2022 | Yu et al. | |
| 2022/0374150 A1 * | 11/2022 | Capri | G06F 3/0611 |
| 2022/0374166 A1 * | 11/2022 | La Fratta | G06F 3/0673 |
| 2023/0016520 A1 | 1/2023 | Sforzin et al. | |
| 2023/0115296 A1 | 4/2023 | Jaser et al. | |
| 2023/0205693 A1 | 6/2023 | Kotra et al. | |
| 2023/0205706 A1 | 6/2023 | Madan et al. | |
| 2024/0004584 A1 | 1/2024 | Madan et al. | |
| 2024/0103745 A1 | 3/2024 | Madan et al. | |
| 2024/0160364 A1 | 5/2024 | Dutu et al. | |
| 2024/0184702 A1 | 6/2024 | Gouldey et al. | |

OTHER PUBLICATIONS

Islam, Mahzabeen, et al., "US Application as Filed", U.S. Appl. No. 17/953,723, filed Sep. 27, 2022, 52 pages.

Madan, Niti, et al., "US Application as Filed", U.S. Appl. No. 17/954,784, filed Sep. 28, 2022, 47 pages.

U.S. Appl. No. 17/561,454, "Notice of Allowance", U.S. Appl. No. 17/561,454, filed Apr. 10, 2024, 5 pages.

U.S. Appl. No. 17/855,109, "Notice of Allowance", U.S. Appl. No. 17/855,109, filed Feb. 22, 2024, 7 pages.

U.S. Appl. No. 17/561,454, filed Apr. 12, 2023, "Final Office Action", U.S. Appl. No. 17/561,454, filed Apr. 12, 2023, 13 pages.

U.S. Appl. No. 17/561,454, filed Oct. 13, 2023, "Non-Final Office Action", U.S. Appl. No. 17/561,454, filed Oct. 13, 2023, 11 pages.

U.S. Appl. No. 17/561,454, filed Oct. 19, 2022, "Non-Final Office Action", U.S. Appl. No. 17/561,454, filed Oct. 19, 2022, 11 pages.

U.S. Appl. No. 17/855,109, "Non-Final Office Action", U.S. Appl. No. 17/855,109, filed Oct. 26, 2023, 9 pages.

PCT/US2023/033820, "International Seach Report and Written Opinion", PCT Application No. PCT/US2023/033820, Jan. 18, 2024, 7 pages.

U.S. Appl. No. 17/855,109, "Corrected Notice of Allowability", U.S. Appl. No. 17/855,109, filed May 24, 2024, 3 pages.

U.S. Appl. No. 17/986,623, "Final Office Action", U.S. Appl. No. 17/986,623, filed Jul. 22, 2024, 7 pages.

U.S. Appl. No. 17/986,623, "Non-Final Office Action", U.S. Appl. No. 17/986,623, filed Feb. 14, 2024, 12 pages.

U.S. Appl. No. 17/954,784, "Final Office Action", U.S. Appl. No. 17/954,784, filed Oct. 30, 2024, 17 pages.

U.S. Appl. No. 17/954,784, "Non-Final Office Action", U.S. Appl. No. 17/954,784, filed Aug. 28, 2024, 31 pages.

U.S. Appl. No. 17/954,784, "Notice of Allowance", U.S. Appl. No. 17/954,784, filed Sep. 24, 2024, 8 pages.

U.S. Appl. No. 17/986,623, "Notice of Allowance", U.S. Appl. No. 17/986,623, filed Sep. 24, 2024, 8 pages.

* cited by examiner

400

402
Compile a program to generate a plurality of commands for execution by a processing in memory component embedded in a memory, the memory including a first group of banks and a second group of banks

404
Transmit, to a memory controller, a first stream of commands which cause the processing in memory component to perform operations that access the first group of banks

406
Transmit, to the memory controller, an identification command that identifies a next row of the first group of banks that is to be accessed by the processing in memory component

408
Transmit, to the memory controller, a second stream of commands which cause the processing in memory component to perform operations that access the second group of banks

FIG. 4

BANK-LEVEL PARALLELISM FOR PROCESSING IN MEMORY

BACKGROUND

Processing in memory (PIM) devices are embedded within a memory module to enable data to be obtained from memory and processed entirely within the memory module. PIM devices alleviate memory performance and energy bottlenecks by moving memory-intensive computations closer to memory. Further, in comparison to standard computer architectures which access off-chip memory systems, PIM devices enable increased computer performance and reduced data transfer latency.

BRIEF DESCRIPTION OF THE DRAWINGS

The detailed description is described with reference to the accompanying figures.

FIG. 4 depicts a procedure in an example implementation showing an order in which PIM commands are scheduled and transmitted to a memory controller in accordance with the described techniques.

DETAILED DESCRIPTION

Overview

Figure 1:
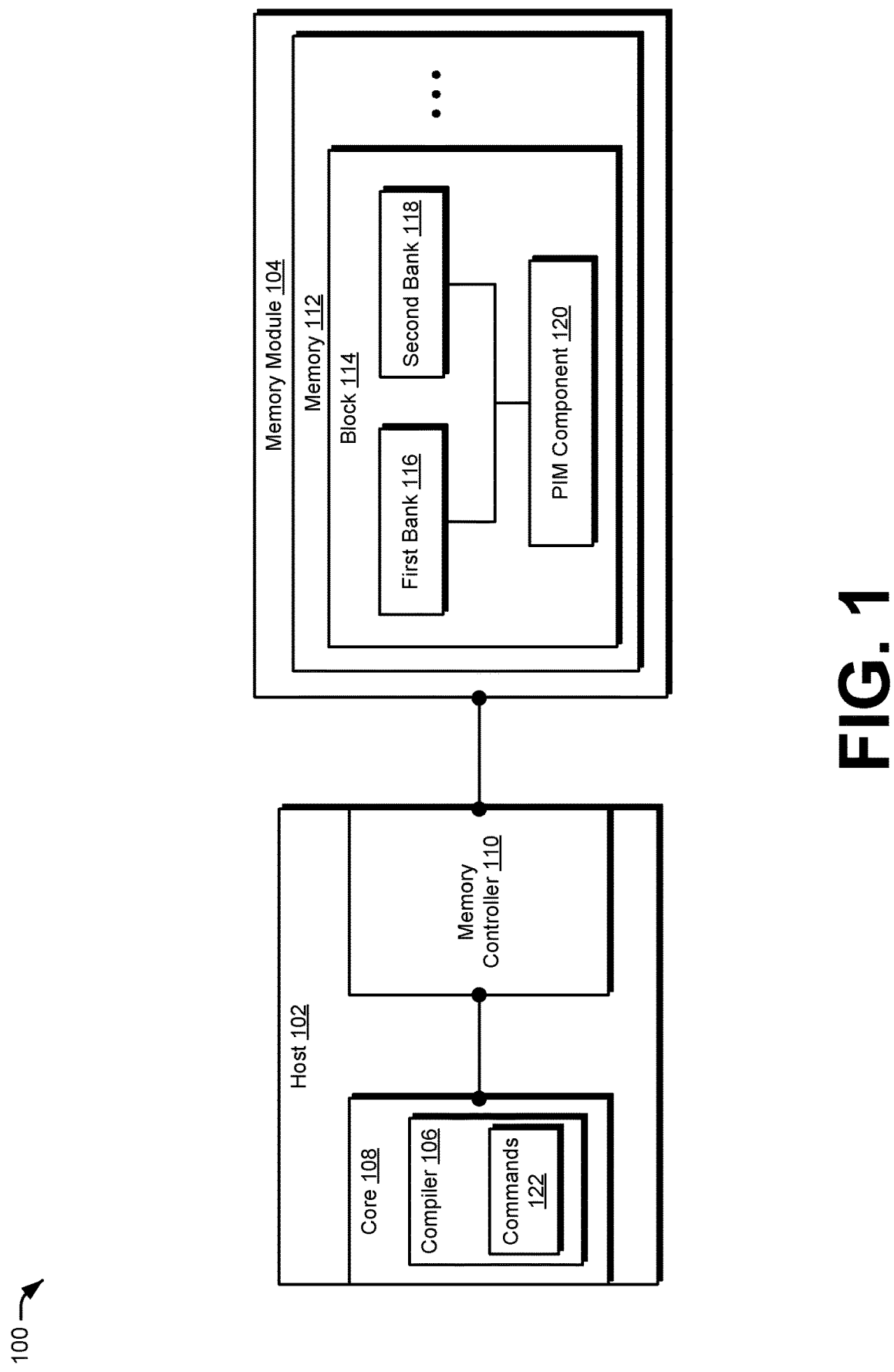
FIG. 1 is a block diagram of a non-limiting example system having a host with a core and a memory controller coupled to a memory module having a memory and one or more processing in memory components embedded in the memory module.

Processing in memory (PIM) components are embedded within a memory module to enable data to be obtained from a memory and processed entirely within the memory module. By doing so, the PIM components alleviate memory performance and energy bottlenecks by moving memory-intensive computations closer to memory. Further, the PIM components reduce data transfer latency and improve overall computer performance, as compared to standard computer architectures which access off-chip memory systems.

Generally, a dynamic random access memory (DRAM) includes a plurality of banks where data is stored. More specifically, the banks of a DRAM include memory arrays that are organized into rows and columns of a grid, such that data is maintained in individual cells of the grid. In order to access a bank of the DRAM (e.g., to load data from the bank of the DRAM for further processing by a PIM component and/or a host processing unit or to store data that has been processed by the PIM component and/or the host processing unit to the bank of the DRAM), a particular row of the bank where data is to be loaded from and/or stored to is opened. Further, in order to open a new row in a bank of the DRAM, a row that is currently open in the bank is closed. Therefore, in order to access a new DRAM row, a memory controller is employed to issue a precharge command to close a currently open DRAM row and an activate command to open the new DRAM row.

Notably, there is a considerable amount of overhead for opening a DRAM row (e.g., referred to as row activate overhead time) and closing a DRAM row (e.g., referred to as row precharge overhead time). In order to hide this overhead, standard computer architectures (e.g., those which access data from off-chip memory systems) utilize bank-level parallelism. Bank-level parallelism is a degree to which multiple banks of a memory are concurrently occupied with servicing memory commands. To enable bank-level parallelism, standard or conventional memory controllers include complex logic and advanced queueing techniques to re-order memory commands to keep multiple banks busy with servicing the memory commands and to maximize row buffer locality.

In contrast to conventional memory commands, PIM commands often depend on data maintained in registers (e.g., temporary data storage) of a PIM component and are broadcast to multiple banks in parallel. Due to these differences, PIM commands are issued in program order (e.g., without being re-ordered) to preserve functional correctness. As a result, bank-level parallelism is typically not achievable without adding significant memory controller complexity for conventional PIM-enabled systems, leading to low PIM throughput, and decreased computational efficiency of the conventional systems.

Techniques for bank-level parallelism with processing in memory are described herein. In accordance with the described techniques, a DRAM is organized into a plurality of blocks, each including a bank assigned to a first group, a bank assigned to a second group, and a PIM component. Further, the memory controller receives a plurality of PIM commands which are scheduled (e.g., by a compiler) in streams of commands that alternate between access to the first group of banks and the second group of banks. For example, the PIM commands are received by the memory controller in the following order: a first stream of PIM commands that access the first group of banks, a second stream of PIM commands that access the second group of banks, a third stream of PIM commands that access the first group of banks, and so forth. An identification command is inserted (e.g., by the compiler) after each stream of PIM commands. The identification command identifies the next row in a respective group of banks that is subsequently accessed by the PIM components. By way of example, an identification command is inserted after a stream of PIM commands that access a first row of the first group of banks, the identification command identifies a second row of the first group of banks, and the second row of the first group of banks is next accessed by the PIM components. Notably, the identification command instructs the memory controller to preemptively close a row that is no longer accessed by the PIM commands and/or activate a row that will be accessed by the PIM commands in the future without causing any column operations to be performed.

Given an identification command inserted after a stream of commands that access a first row in the first group of banks and identifying a second row in the first group of banks, the memory controller is instructed to schedule a precharge command to close the first row and an activate command to open the second row. In one or more implementations, the memory controller schedules the activate command in parallel with execution of a subsequent stream of PIM commands, which cause the processing in memory components to perform operations that access the second group of banks. Additionally or alternatively, the memory controller schedules the precharge command in parallel with execution of the subsequent stream of PIM commands, which cause the processing in memory components to perform operations that access the second group of banks.

By doing so, the memory controller 110 overlaps row activate overhead time and/or row precharge overhead time in one group of banks with execution of PIM commands that access a different group of banks. Therefore, the described techniques enable processing of PIM commands faster than conventional PIM-enabled systems, leading to higher PIM throughput and increased computational efficiency.

In some aspects, the techniques described herein relate to a computing device including a memory that includes a first bank and a second bank, a processing in memory component embedded in the memory, and a memory controller to receive a plurality of commands for execution by the processing in memory component, the plurality of commands including a first stream of commands which cause the processing in memory component to perform operations that access the first bank and a second stream of commands which cause the processing in memory component to perform operations that access the second bank, identify a next row of the first bank that is to be accessed by the processing in memory component after the first stream of commands, and schedule, an activate command to open the next row of the first bank in parallel with execution of the second stream of commands.

In some aspects, the techniques described herein relate to a computing device, wherein the next row is identified based on an identification command of the plurality of commands which identifies the next row to be accessed by the processing in memory component without causing the processing in memory component to perform operations that access the next row.

In some aspects, the techniques described herein relate to a computing device, wherein the memory is organized into a plurality of blocks, each block including a bank assigned to a first group, a bank assigned to a second group, and a respective processing in memory component shared among the banks included in a respective block.

In some aspects, the techniques described herein relate to a computing device, wherein the first bank is assigned to the first group, the second bank is assigned to the second group, and the processing in memory component is shared among the first bank and the second bank.

In some aspects, the techniques described herein relate to a computing device, wherein the activate command causes banks assigned to the first group to open the next row in parallel, and the second stream of commands cause the respective processing in memory components to perform operations that access banks assigned to the second group in parallel.

In some aspects, the techniques described herein relate to a computing device, wherein the memory controller is further configured to inspect rows accessed by the plurality of commands and scheduling the activate command based on the inspection.

In some aspects, the techniques described herein relate to a computing device, wherein the memory controller is further configured to predict, using a prediction policy, the next row of the first bank to be accessed by the processing in memory component and schedule the activate command to open the next row based on the prediction.

In some aspects, the techniques described herein relate to a computing device, wherein the memory controller is further configured to update the prediction policy based on whether a row of the first bank that is opened based on the predicting is a row of the first bank that is accessed next by the processing in memory component.

In some aspects, the techniques described herein relate to a computing device, wherein the memory controller is further configured to receive one or more hints indicative of at least one of an amount of data that is to be processed by the processing in memory component in executing the plurality of commands or a number of data structures involved in the plurality of commands, and predict the next row of the first bank to be accessed by the processing in memory component based on the one or more hints.

In some aspects, the techniques described herein relate to a computing device, wherein the plurality of commands include the first stream of commands which cause the processing in memory component to perform operations that access a first row of the first bank, and an identification command which identifies the next row of the first bank.

In some aspects, the techniques described herein relate to a computing device, wherein the memory controller is further configured to identify a first set of the second stream of commands having a combined execution time that is equal to or greater than an overhead time for closing a row of the memory.

In some aspects, the techniques described herein relate to a computing device, wherein the memory controller is further configured to schedule, based on the identification command, a precharge command to close the first row of the first bank in parallel with execution of the first set of the second stream of commands by the processing in memory component.

In some aspects, the techniques described herein relate to a computing device, wherein the activate command is scheduled after the first set of the second stream of commands and causes the first bank to open the next row in parallel with execution of a second set of the second stream of commands by the processing in memory component.

In some aspects, the techniques described herein relate to a system including a memory that includes a first bank and a second bank, a processing in memory component embedded in the memory, a core to issue commands for execution by the processing in memory component, the commands including an identification command that identifies a next row of the first bank that is to be accessed by the processing in memory component, and a memory controller to receive the commands from the core, and schedule, based on the identification command, a precharge command to close a first row of the first bank in parallel with execution of a first set of the commands which cause the processing in memory component to perform operations that access the second bank.

In some aspects, the techniques described herein relate to a system, wherein the memory is a dynamic random access memory organized into a plurality of blocks, each block including a bank assigned to a first group, a bank assigned to a second group, and a respective processing in memory component shared among the banks included in a respective block, and the first bank, the second bank, and the processing in memory component comprise one block of the dynamic random access memory.

In some aspects, the techniques described herein relate to a system, wherein the memory controller is further configured to schedule, based on the identification command, an activate command to open the next row of the first bank in parallel with execution of a second set of the commands which cause the processing in memory component to perform operations that access the second bank In some aspects, the techniques described herein relate to a system, wherein the memory controller is further configured to delay issuance of the activate command until after an overhead time for closing the first row has elapsed.

In some aspects, the techniques described herein relate to a method including compiling a program to generate a plurality of commands for execution by a processing in memory component embedded in a memory, the memory including a first bank and a second bank, the plurality of commands including an identification command that identifies a next row of the first bank that is to be accessed by the processing in memory component and a set of the commands which cause the processing in memory component to perform operations that access the second bank, and transmitting the plurality of commands to a memory controller, the identification command instructing the memory controller to close a first row of the first bank and open the next row of the first bank in parallel with execution of the set of the commands.

In some aspects, the techniques described herein relate to a method, wherein transmitting the plurality of commands includes transmitting a first stream of the commands which cause the processing in memory component to perform operations that access the first bank followed by a second stream of the commands including the set of the commands which cause the processing in memory component to perform operations that access the second bank.

In some aspects, the techniques described herein relate to a method, the method further including calculating a number of commands to include in the first stream of commands and the second stream of commands, the number of commands having a combined execution time that is equal to or greater than an overhead time for closing a row of the memory and opening an additional row of the memory.

FIG. 1 is a block diagram of a non-limiting example system 100 having a host with a core and a memory controller coupled to a memory module having a memory and one or more processing in memory components embedded in the memory module. In particular, the system 100 includes a host 102 and a memory module 104. In this example, the host 102 includes a compiler 106 which runs on a core 108 and a memory controller 110. The memory module 104 includes a memory 112 organized into a plurality of blocks 114. Each block 114 includes a first bank 116, a second bank 118, and a processing in memory (PIM) component 120. In one or more implementations, the compiler 106 compiles a program to generate a plurality of PIM commands 122 for execution by the PIM component(s) 120.

In accordance with the described techniques, the host 102 and the memory module 104 are coupled to one another via a wired or wireless connection. The core 108 and the memory controller 110 are also coupled to one another via one or more wired or wireless connections. Example wired connections include, but are not limited to, buses (e.g., a data bus), interconnects, traces, and planes. Examples of devices in which the system 100 is implemented include, but are not limited to, servers, personal computers, laptops, desktops, game consoles, set top boxes, tablets, smartphones, mobile devices, virtual and/or augmented reality devices, wearables, medical devices, systems on chips, and other computing devices or systems.

The host 102 is an electronic circuit that performs various operations on and/or using data in the memory 112. Examples of the host 102 include, but are not limited to, a central processing unit (CPU), a graphics processing unit (GPU), a field programmable gate array (FPGA), an accelerated processing unit (APU), and a digital signal processor (DSP). The core 108 is a processing unit that reads and executes commands (e.g., of a program), examples of which include to add and to move data. Although one core 108 is depicted in the example system 100, in variations, the host 102 includes more than one core 108, e.g., the host 102 is a multi-core processor.

In one or more implementations, the memory module 104 is a circuit board (e.g., a printed circuit board), on which the memory 112 is mounted and includes the PIM component 120. In variations, one or more integrated circuits of the memory 112 are mounted on the circuit board of the memory module 104, and the memory module 104 includes one or more PIM components 120. Examples of the memory module 104 include, but are not limited to, single in-line memory module (SIMM), dual in-line memory module (DIMM), high-bandwidth memory (HBM), and TransFlash memory module.

The memory 112 is a device or system that is used to store information, such as for immediate use in a device, e.g., by the core 108 of the host 102 and/or by the PIM component 120. In one or more implementations, the memory 112 corresponds to semiconductor memory where data is stored within memory cells on one or more integrated circuits. In at least one example, the memory 112 corresponds to or includes volatile memory, examples of which include random-access memory (RAM), dynamic random access memory (DRAM), synchronous dynamic random access memory (SDRAM), and static random-access memory (SRAM). Alternatively or in addition, the memory 112 corresponds to or includes non-volatile memory, examples of which include flash memory, read-only memory (ROM), programmable read-only memory (PROM), erasable programmable read-only memory (EPROM), and electronically erasable programmable read-only memory (EEPROM). Thus, the memory 112 is configurable in a variety of ways that support bank-level parallelism for processing in memory without departing from the spirit or scope of the described techniques.

The memory controller 110 is a digital circuit that manages the flow of data to and from the memory 112. By way of example, the memory controller 110 includes logic to read and write to the memory 112 and interface with the PIM component 120, e.g., to provide PIM commands 122 to the PIM component 120 for processing by the PIM component 120. The memory controller 110 also interfaces with the core 108. For instance, the memory controller 110 receives commands from the core 108 which involve accessing the memory 112 and provides data to the core 108, e.g., for processing by the core 108. In one or more implementations, the memory controller 110 is communicatively located between the core 108 and the memory module 104, and the memory controller 110 interfaces with both the core 108 and the memory module 104.

In one or more implementations, the host 102 generates the PIM commands 122 by running the compiler 106, and transmits the PIM commands 122, via the memory controller 110, to the memory module 104. Broadly, the PIM component 120 includes one or more in-memory processors and is configured to process the PIM commands 122. For example, the one or more in-memory processors of the PIM component 120 processes the PIM commands 122 using data stored in the memory 112. Processing in memory using in-memory processors contrasts with standard computer architectures which obtain data from memory, communicate the data to the core 108 of the host 102, and process the data using the core 108 rather than the PIM component 120.

In various scenarios, the data produced by the core 108 as a result of processing the obtained data is written back to the memory 112, which involves communicating the produced data over the pathway from the core 108 to the memory 112. In terms of data communication pathways, the core 108 of the host 102 is further away from the memory 112 than the PIM component 120. As a result, these standard computer architectures suffer from increased data transfer latency, particularly when the volume of data transferred between the memory 112 and the host 102 is large, which can also decrease overall computer performance. Thus, the PIM component 120 increases computer performance while reducing data transfer latency as compared to standard computer architectures that which access off-chip memory systems. Further, the PIM component 120 alleviates memory performance and energy bottlenecks by moving one or more memory-intensive computations closer to the memory 112.

In one or more implementations, the memory 112 is a dynamic random access memory, and includes a plurality of banks (e.g., the first bank 116 and the second bank 118) where data is stored. In particular, the banks are organized into one or more memory arrays (e.g., grids), which include rows and columns such that data is stored in individual cells of the memory arrays.

In order to access data maintained in the memory 112 organized in this way (e.g., to load data from a bank of the memory 112 for further processing by the PIM component 120, and/or to store data that has been processed by the PIM component to a bank of the memory 112), a particular row of the bank where data is to be loaded from and/or stored to is opened. As used herein, "opening" a row of a bank causes data maintained in the row to be loaded into a row buffer of the bank. From the row buffer, data maintained in a row and column address of the open row can be read to registers (e.g., temporary data storage) maintained by the PIM component 120. In one or more implementations, the PIM component 120 executes the PIM commands 122 using data residing in the registers. Further, data produced by the PIM component 120 (e.g., as a result of processing the data residing in the registers) can be written from the registers back to the row buffer of the bank. In order to open a new row of the bank, a row that is currently open in the row buffer of the bank is closed. As used herein, "closing" a row clears the row buffer and causes the data that is currently maintained in the row buffer to be written back to a corresponding row of the bank.

The memory controller 110 is configured to schedule and issue DRAM commands that are utilized to execute the PIM commands 122. The DRAM commands include precharge commands and activate commands. Given a set of PIM commands 122 which cause the PIM component 120 to perform operations that access a row of the first bank 116 (e.g., "load" operations which load data from the row of the first bank 116 to the registers and/or "store" operations which store data that has been processed by the PIM component 120 to the row of the first bank 116), the memory controller 110 is configured to issue a precharge command to close a previously opened row in the first bank 116 as well as an activate command to open the row of the first bank 116 that is accessed by the set of PIM commands 122.

The amount of time that it takes the memory 112 to service the DRAM commands is referred to herein as DRAM overhead time. The DRAM overhead time, for instance, includes row precharge overhead time (e.g., the time it takes for the memory 112 to close a row) and row activate overhead time (e.g., the time it takes for the memory 112 to open a row). To hide DRAM overhead time, standard computer architectures (e.g., those which communicate data to the core 108 of the host 102 for processing, rather than the PIM component 120) utilize bank-level parallelism. Broadly, a system will incur a decrease in performance due to low bank-level parallelism when banks sit idle waiting for other banks to service memory commands. In contrast, a system improves performance due to high bank-level parallelism when all or a majority of banks are concurrently occupied with servicing memory commands.

To achieve such parallelism, a standard memory controller typically employs logic to re-order memory commands to keep multiple banks busy servicing the memory commands and to maximize row buffer locality. To do so, the standard memory controller inspects row addresses associated with enqueued commands to schedule the commands in look-ahead fashion, e.g., to schedule commands that meet all dependencies without waiting for a previous command to complete. This scheduling policy implemented by the standard memory controller tracks all commands, their timing requirements, and all dependencies between commands. Accordingly, standard computer architectures require complex logic and advanced queuing techniques to support bank-level parallelism.

In contrast to those memory commands, the PIM commands 122 are broadcast to multiple banks in parallel, and as such, are subject to different memory constraints. Further, the PIM commands 122 often depend on data maintained in the registers of the PIM component. Due to this, dependencies between the PIM commands 122 are not determined by simply inspecting row addresses associated with the PIM commands 122. Instead, the dependencies between the PIM commands 122 are determinable by additionally inspecting the registers accessed by the PIM commands 122. In one or more implementations, the memory controller 110 does not include the complex logic utilized to inspect the registers accessed by the PIM commands 122. In one or more variations, the PIM commands are issued in order (e.g., without being re-ordered) in order to preserve functional correctness.

As a result, bank-level parallelism is typically not achievable without adding significant memory controller complexity for conventional PIM-enabled systems which include multiple banks that share a PIM component. While a PIM component of a conventionally configured system executes one or more PIM commands that access one bank, for instance, other banks that service the PIM component often sit idle, e.g., without servicing memory commands. Further, when a new row is subsequently accessed, such conventionally configured systems typically wait for row precharge overhead time (e.g., to close a previously opened row) and row activate overhead time (e.g., to open the new row) before servicing a subsequent PIM command that accesses the new row. This leads to low PIM throughput and performance degradation. These problems are further exacerbated because PIM-enabled systems often utilize more frequent row accesses (e.g., rows are opened and closed more frequently) in comparison to standard systems.

To overcome the drawbacks of conventionally configured systems having PIM components, techniques to enable bank-level parallelism for processing in memory are used. In accordance with the described techniques, the memory 112 is organized into a plurality of blocks 114. In one or more implementations, for example, each block 114 includes a same number of banks and each of the banks in a given block 114 is assigned to a different group. Thus, in the illustrated example involving two banks per block 114, each block 114 includes a bank (e.g., the first bank 116) assigned to a first group and an additional bank (e.g., the second bank 118) assigned to a second group. In variations, the memory 112 can include any number of blocks 114 and any number of banks per block 114.

In accordance with the described techniques, the compiler 106 compiles a program to generate a plurality of PIM commands 122 for execution by the PIM component 120. In one or more implementations, the compiler 106 schedules the PIM commands 122 in streams of PIM commands which alternate between access to the first bank 116 and access to the second bank 118—or that are interleaved across more banks in variations. For example, the compiler 106 schedules a stream of PIM commands 122 that access the first bank 116, followed by a second stream of PIM commands that access the second bank 118, followed by a third stream of PIM commands that access the first bank 116, and so forth.

In implementations, the compiler 106 inserts an identification command after each stream of PIM commands 122 that access a particular bank. An identification command, for instance, is inserted after a stream of commands that access a row of a particular bank, and the identification command identifies a next row of the particular bank that is subsequently accessed by the PIM component 120. By way of example, an identification command is inserted after a first stream of PIM commands 122 that access a first row of the first bank 116, and the identification command identifies a next row of the first bank 116 that is to be accessed by the PIM component 120. Furthermore, an additional identification command is inserted after a second stream of PIM commands that access a first row of the second bank 118, and the additional identification command identifies the next row of the second bank 118 that is to be accessed by the PIM component 120. Notably, the identification command identifies the next row of a respective bank that is to be accessed by the PIM component 120 without causing the PIM component to perform operations (e.g., load operations and store operations) that access the next row.

The memory controller 110 receives the PIM commands 122 in the order determined by the compiler 106 and enqueues the PIM commands 122 (e.g., in a PIM queue) in the determined order. Further, the memory controller 110 issues the PIM commands in the determined order to the memory 112 for execution by the PIM component 120, e.g., without re-ordering the PIM commands. As previously described, the memory controller 110 also schedules DRAM commands that are utilized to execute the PIM commands 122. Notably, the DRAM commands, in contrast to the PIM commands 122, are scheduled in look-ahead fashion. In other words, the memory controller can schedule DRAM commands which meet all dependencies without waiting for a previous DRAM command to complete.

In one example, the memory controller 110 receives a first stream of PIM commands that access a first row of the first bank 116, an identification command that identifies a next row of the first bank 116 that is to be accessed by the PIM component 120, and a second stream of PIM commands that access the second bank 118. The identification command instructs the memory controller 110 to schedule a precharge command to close the first row of the first bank 116 and to schedule an activate command to open the next row of the first bank 116. In one or more implementations, the activate command is scheduled to be serviced by the memory 112 in parallel with execution of the second stream of PIM commands that access the second bank 118. Additionally or alternatively, the precharge command is scheduled to be serviced by the memory 112 in parallel with execution of the second stream of PIM commands that access the second bank 118.

By issuing the precharge command to close a currently open row in the first bank 116 while the PIM component executes PIM commands 122 that access the second bank 118, the row precharge overhead time for the first bank 116 is hidden by PIM computation time. Moreover, by issuing the activate command to open a next row in the first bank 116 that is subsequently accessed by the PIM component 120 in parallel with execution of PIM commands 122 that access the second bank 118, the row activate overhead time for the first bank 116 is hidden by PIM computation time. Therefore, the described techniques significantly increase PIM throughput and computational efficiency, as compared to conventional PIM-enabled systems.

Figure 2:
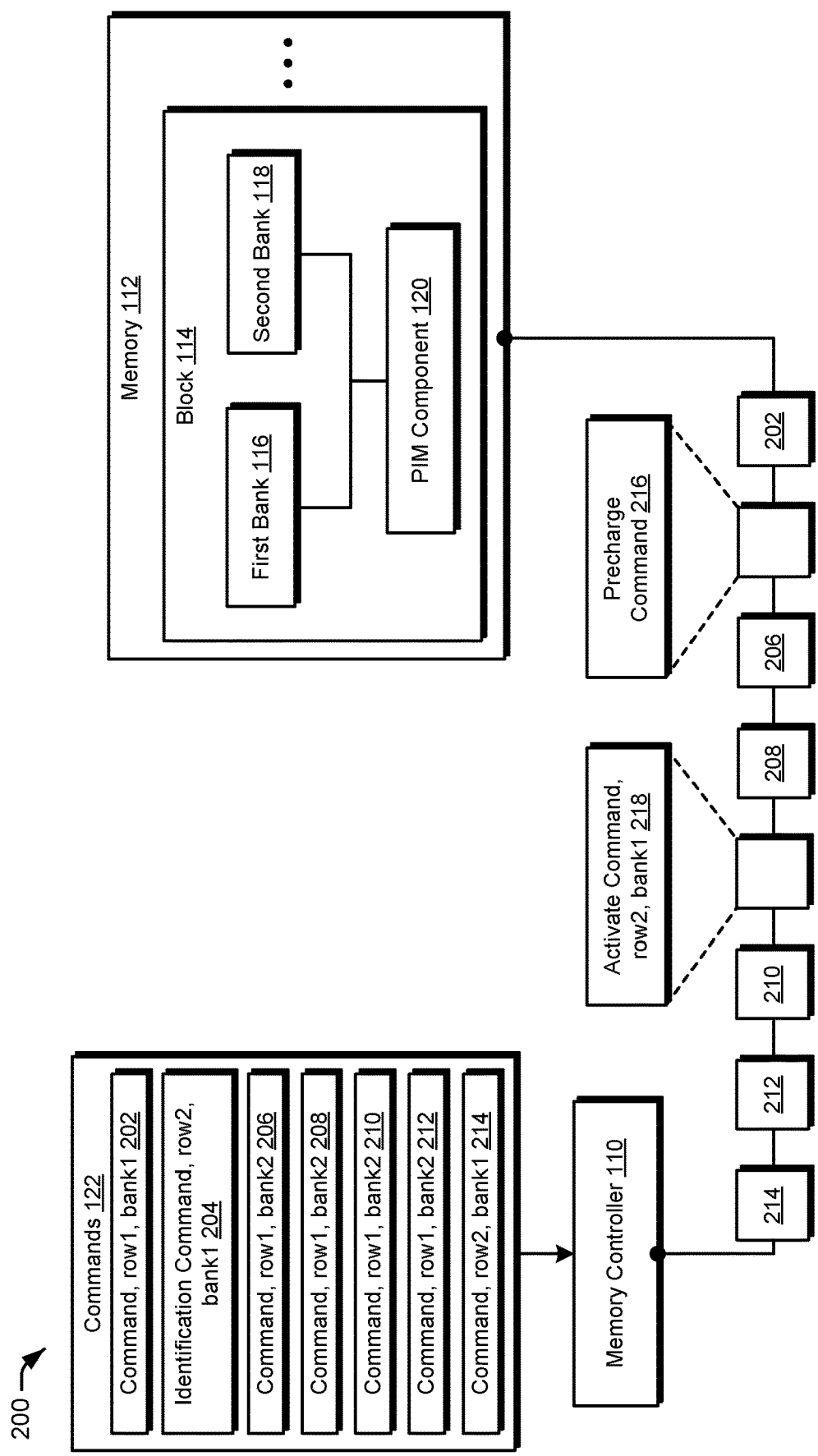
FIG. 2 depicts a non-limiting example in which a memory controller schedules a precharge command and an activate command to enable bank-level parallelism in accordance with the described techniques.

FIG. 2 depicts a non-limiting example 200 in which a memory controller schedules a precharge command and an activate command to enable bank-level parallelism in accordance with the described techniques. Example 200 includes the PIM commands 122, the memory controller 110, the memory 112, as well as the first bank 116, the second bank 118, and the PIM component 120 included in one or more blocks 114 of the memory 112. Notably, the PIM commands 122 in the example 200 include a PIM command 202 that accesses a first row of the first bank 116, an identification command 204 that identifies a second row of the first bank 116 (e.g., that is next accessed by the PIM component 120), a stream of PIM commands 206, 208, 210, 212 that access a first row of the second bank 118, and a PIM command 214 that accesses a second row of the first bank 116. Based on the identification command 204, the memory controller 110 is instructed to schedule a precharge command 216 to close the first row of the first bank 116 and an activate command to open the second row of the first bank 116 in parallel with execution by the PIM component 120 of the PIM commands 206, 208, 210, 212 that access the first row of the second bank 118.

In accordance with the described techniques, the PIM commands 122 are scheduled in streams of commands which alternate between access to the first bank 116 and the second bank 118. For example, the PIM commands 122 are scheduled in the following order: (1) a first stream of PIM commands 122 that access the first bank 116, (2) a second stream of PIM commands 122 that access the second bank 118, (3) a third stream of PIM commands 122 that access the first bank 116, and so on. Although this functionality is described as implemented by the compiler 106, it is to be appreciated that the scheduling of the PIM commands can be performed by the compiler 106 or through programming using framework libraries that support the described techniques.

In one or more implementations, timing constraints associated with executing the PIM commands 122, opening rows of the memory 112, and closing rows of the memory 112 are known or otherwise accessible by the compiler 106. Given this, the compiler 106 is configured to calculate a number of commands to include in each stream of PIM commands 122 based on the timing constraints associated with the PIM commands 122, the row precharge overhead time, and the row activate overhead time. In particular, the compiler 106 includes a number of PIM commands 122 in each stream so that an execution time of each stream of PIM commands 122 is equal to or greater than an amount of time which corresponds to a combination of both the row precharge overhead time and the row activate overhead time.

In the illustrated example 200, for instance, each PIM command 122 has a computation time of eight nanoseconds, while the DRAM overhead time (e.g., row precharge overhead time and row activate overhead time) is thirty nanoseconds. In this example, the number of PIM commands included in each stream of PIM commands 122 is equal to or greater than thirty nanoseconds. Therefore, the compiler 106 schedules four PIM commands 122 (e.g., having a combined execution time of thirty-two nanoseconds) in each stream of PIM commands. In this way, the execution time of each stream of PIM commands 122 that access the first bank 116 hides the row precharge overhead time and the row activate overhead time in the second bank 118, and vice versa. In variations, computation times and overhead times differ from the examples mentioned above without departing from the spirit or scope of the described techniques.

In at least one variation, the PIM component 120 utilizes a number of registers that is equivalent to the number of PIM commands included in the alternating streams of PIM commands for each bank in the block 114. In the previous example involving four PIM commands in each stream, for instance, the PIM component 120 utilizes four registers for PIM commands assigned to the first bank 116 and four registers for PIM commands assigned to the second bank 118. Thus, in this example, the PIM component 120 includes at least eight registers. It is to be appreciated that different numbers of registers are utilized by the PIM component 120 depending on different numbers of banks in the block 114, and different numbers of PIM commands 122 in the alternating streams of PIM commands.

In one or more implementations, identification commands 204 are inserted into the plurality of PIM commands 122 after each stream of PIM commands that access a particular bank. In accordance with the described techniques, the identification commands 204 identify the next row of the particular bank that is to be accessed by a subsequent stream of PIM commands. In the illustrated example 200, for instance, the compiler 106 inserts the identification command 204 after a first stream of PIM commands (e.g., including the PIM command 202) that access the first row of the first bank 116. Further, the identification command 204 identifies the next row of the first bank 116 (e.g., the second row) that is to be accessed by a subsequent stream of PIM commands, e.g., including the PIM command 214. Although this functionality is described as performed by the compiler 106, it is to be appreciated that the inserting of the identification commands 204 can be implemented by the compiler 106 or by programming which uses framework libraries that support the described techniques.

The PIM commands 122, including the identification commands 204, are generated by the compiler 106 running on the core 108 of the host 102. In implementations, the core 108 of the host 102 issues the PIM commands 122 and the identification commands 204 to the memory controller 110 with physical memory addresses. The identification command 204, for example, includes a physical memory address that identifies the next row that is accessed by a bank. Notably, the identification commands 204 identify the next row of a respective bank without causing the PIM component 120 to perform operations that access the next row of the respective bank. In other words, the identification command 204 indicates intent to access a row in the future, but does not perform a load operation, a store operation, or other operations that actually access the identified row at the time. In at least one implementation, the identification commands 204 follow write command semantics since the core 108 does not expect any data to be returned from the memory 112. As further described below, the memory controller 110 is configured to recognize the identification commands 204 and schedule DRAM commands based on the row identified by the identification commands 204.

After issuing the PIM command 202 that accesses the first row of the first bank 116 in the example 200, the memory controller 110 detects that the next command in the PIM queue is the identification command 204. Upon encountering the identification command 204 in the PIM queue, the memory controller 110 inspects the physical memory address included in the identification command 204 to identify the second row of the first bank 116. If the identification command 204 includes a row of the first bank 116 that is already open in the first bank 116, then the memory controller 110 does not schedule any additional DRAM commands. In contrast, if the identification command 204 identifies a new row of the first bank 116 (e.g., the second row of the first bank 116), then the memory controller 110 schedules a precharge command 216 to close the first row of the first bank 116 and an activate command 218 to open the second row of the first bank 116.

In one or more implementations, the memory controller 110 schedules the precharge command 216 and the activate command 218 to close the first row of the first bank 116 and open the second row of the first bank 116, respectively, in parallel with execution of the PIM commands 206, 208, 210, 212, which cause the PIM component 120 to perform operations that access the second bank 118. To do so, the memory controller 110 schedules the precharge command 216 and the activate command 218 in an interleaved fashion. As shown in the illustrated example 200, for instance, the memory controller 110 schedules the precharge command 216, followed by a first set of PIM commands 206, 208 which operate on data maintained in the second bank 118, followed by the activate command 218, followed by a second set of PIM commands 210, 212 which also operate on data maintained in the second bank 118. In at least one variation, the precharge command 216 is scheduled to be serviced in parallel with the first set of PIM commands 206, 208, while the activate command 218 is scheduled to be serviced in parallel with the second set of PIM commands 210, 212.

To implement such an interleaved scheduling policy, the memory controller 110 initially enqueues the precharge command 216 and the activate command 218 in a DRAM command queue, which is maintained separately from the PIM queue. In at least one implementation, the memory controller 110 is configured to calculate how many subsequent PIM commands that access the second bank 118 have a combined execution time that is equal to or greater than the row precharge overhead time. This calculation is based on timing constraints which are known or otherwise accessible by the memory controller 110. In the illustrated example 200, for instance, each PIM command 122 has a computation time of eight nanoseconds, while the row precharge overhead time is fifteen nanoseconds. Therefore, the memory controller 110 determines that two subsequent PIM commands (e.g., PIM commands 206, 208) have a combined execution time (e.g., sixteen nanoseconds) that is equal to or greater than the row precharge overhead time.

The memory controller 110 is configured to interleave the determined number of subsequent PIM commands that access the second bank 118 with the precharge command 216 and the activate command 218. In the illustrated example 200, for instance, the memory controller 110 is configured to schedule the precharge command 216 to close the first row of the first bank 116 immediately after execution of the PIM command 202 that last accesses the first row of the first bank 116. Further, the memory controller 110 is configured to schedule the activate command 218 to open the second row of the first bank 116 immediately after execution of the determined number of commands that access the second bank 118. In this way, the first row of the first bank 116 is closed in parallel with execution of a first set of PIM commands 206, 208, which operate on data maintained in the second bank 118. Since each stream of PIM commands includes a sufficient amount of PIM execution time to cover the row precharge overhead time and the row activate overhead time, the second row of the first bank 116 is opened in parallel with execution of a second set of PIM commands 210, 212, which access the second bank 118.

In at least one implementation, the precharge command 216 and the activate command 218 are enqueued in the DRAM command queue, one after another. In accordance with such implementations, the memory controller 110 is configured to schedule the precharge command 216 to open the first row of the first bank 116 immediately after the PIM command 202 is executed. Rather than issuing the activate command 218 after execution of some determined number of subsequent PIM commands which access the second bank 118, as described above, the memory controller 110 waits to issue the activate command 218 until after the row precharge overhead time has elapsed for the precharge command 216. In this way, the first row of the first bank 116 is closed in parallel with execution of a first portion of the stream of PIM commands 206, 208, 210, 212 that access the second bank 118. Since each stream of PIM commands includes a sufficient amount of PIM execution time to cover the row precharge overhead time and the row activate overhead time, the second row of the first bank 116 is opened in parallel with execution of a second portion of the stream of PIM commands 206, 208, 210, 212 that access the second bank 118.

In order to implement an interleaved scheduling policy, the memory controller 110 includes additional hardware in at least one variation. For example, the memory controller 110 includes additional hardware to calculate the number of subsequent PIM commands (e.g., commands 206, 208) having a combined execution time that is equal to or greater than the row precharge overhead time. Additionally or alternatively, the memory controller 110 includes additional hardware to delay issuance of the activate command 218 based on the row precharge overhead time.

In other variations, the memory controller 110 does not include such additional hardware. In accordance with the described techniques, the memory controller 110 schedules the precharge command 216 and the activate command 218 in a non-interleaved fashion. For example, after issuing the PIM command 202 that last accesses the first row of the first bank 116, the memory controller 110 determines that the next command in the PIM queue is the identification command 204 that identifies the second row of the first bank 116. Based on the identification command 204, the memory controller 110 schedules the precharge command 216 to close the first row of the first bank 116 immediately after the PIM command 202 is executed. Without the additional hardware mentioned above, the memory controller 110 does not schedule the subsequent PIM commands 206, 208, 210, 212 that access the second bank 118 until the first row of the first bank 116 is closed. After the row precharge overhead time has passed, the memory controller 110 schedules the activate command 218 to open the second row of the first bank 116 in parallel with execution of the subsequent PIM commands 206, 208, 210, 212. Accordingly, in implementations in which the memory controller 110 implements the non-interleaved scheduling policy, the row activate overhead time is overlapped with execution of the PIM commands 206, 208, 210, 212 that access the second bank 118. However, the row precharge overhead time is not overlapped with execution of the PIM commands 206, 208, 210, 212 that access the second bank 118.

While the memory controller 110 overlaps only the row activate overhead time in implementations involving the non-interleaved scheduling policy, it does so without utilizing additional hardware at the memory controller 110. Thus, implementations involving the non-interleaved scheduling policy process PIM commands in a shorter amount of time, as compared to conventional techniques, and do so with reduced hardware complexity, as compared to the interleaved scheduling policy.

Although described with respect to the first bank 116 and the second bank 118, it is to be appreciated that the memory controller 110 is configured to issue the PIM commands 122, the precharge command 216, and the activate command 218 to each of the plurality of blocks 114 in parallel. As discussed above, in one or more implementations, the memory 112 includes a plurality of blocks 114, which each include a bank (e.g., the first bank 116) assigned to a first group, and an additional bank (e.g., the second bank 118) assigned to a second group. In accordance with the example 200, the precharge command 216 causes banks assigned to the first group (e.g., including the first bank 116) to open the first row in parallel. Moreover, the activate command 218 causes banks assigned to the first group (e.g., including the first bank 116) to open the second row in parallel. Furthermore, the PIM commands 206, 208, 210, 212 cause the PIM components 120 in each block 114 to perform operations that access banks assigned to the second group (e.g., including the second bank 118) in parallel.

Therefore, in accordance with the interleaved scheduling policy, banks assigned to the first group close a currently open row of the respective bank and open a subsequently accessed row of the respective bank concurrently while the PIM components 120 execute PIM commands 122 that access banks assigned to the second group. Further, in accordance with the non-interleaved scheduling policy, banks assigned to the first group open a subsequently accessed row of a respective bank concurrently while the PIM components 120 execute PIM commands 122 that access banks assigned to the second group.

In one or more variations, the memory controller 110 is configured to schedule the activate command 218 to open the next row in a group of banks that is to be accessed by the PIM components 120 without utilizing the identification command 204. In at least one such variation, for instance, the memory controller 110 does so by inspecting the physical memory addresses associated with PIM commands 122 that are enqueued in the PIM queue. As discussed above, the PIM commands 122 received by the memory controller 110, via the core 108, include physical memory addresses (e.g., row and column addresses) that are accessed by the PIM commands. Since the PIM commands 122 are not re-ordered in the PIM queue, the memory controller 110 can compare earlier enqueued PIM commands to later enqueued PIM commands to identify the first PIM command that accesses a different row in a same group of banks, as compared to an earlier enqueued PIM command. For example, the memory controller 110 inspects the PIM queue to determine that the PIM command 214 is the first command in the PIM queue that accesses the second row in the first group of banks, e.g., including the first bank 116. Based on this determination, the memory controller 110 schedules the activate command 218 to proactively open the second row in the first group of banks in parallel with execution of PIM commands 206, 208, 210, 212 that access the second group of banks, e.g., including the second bank 118.

In at least one additional variation, the memory controller 110 includes a prediction unit to predict the next row accessed by a group of banks. Notably, PIM command streams are scheduled in predictable sequences. For example, in many cases, the PIM command streams are scheduled in the following order: (1) a first stream of commands that access a first row of the first group of banks, (2) a second stream of commands that access a first row of the second group of banks, (3) a third stream of commands that access a second row of the first group of banks, (4) a fourth stream of commands that access a second row of the second group of banks, and so forth. Given this, it is possible to accurately predict a next row that is to be accessed by a group of banks based on a pattern of previously issued PIM commands and a row of the group of banks with respect to which the memory controller 110 is currently issuing PIM commands 122.

Based on the pattern of the PIM commands, for example, the memory controller 110 predicts that the next row accessed by a group of banks is a same row with respect to a currently-accessed row, a next sequential row in comparison to the currently-accessed row, a next sequential row in comparison to a previously-accessed row, etc. The memory controller 110 can, therefore, schedule the activate command 218 to open the row of the first group of banks that is predicted to be accessed next by the PIM components 120 in parallel with execution of PIM commands 206, 208, 210, 212 which access the second group of banks.

In one or more implementations, a prediction policy implemented by the prediction unit is enabled or disabled and/or made more or less aggressive depending on prediction success rate. For example, the memory controller 110 determines whether a prediction was successful based on whether the row that is opened based on the prediction is the next row in the group of banks that is actually accessed by the PIM components 120. If the prediction is successful, the prediction policy is enabled and/or optionally made more aggressive. If the prediction is unsuccessful, the prediction policy is disabled and/or made less aggressive.

In at least one implementation, the core 108 of the host 102 sends hints to the prediction unit to influence the prediction policy. In one example, the core 108 sends a hint to the prediction unit indicative of an amount of data that is to be processed. In this example, the prediction unit predicts a number of activate commands 218 to issue based on the amount of data indicated by the hint. For instance, the prediction unit predicts to issue a larger number of activate commands 218 to proactively open a larger number of rows based on a larger amount of data indicated by the hint. In another example, a hint is sent by the core 108 that indicates a number of data structures involved in the PIM commands 122. In this example, the rows that the prediction unit predicts to proactively open are determined, in part, based on the number of data structures. In an example involving three data structures, for instance, the prediction unit predicts to open row (x) for a first data structure, then row (y) for a second data structure, followed by row (z) for a third data structure. In the following three activate commands, the prediction unit predicts to activate row (x+1) for the first data structure, then row (y+1) for the second data structure, followed by row (z+1) for the third data structure.

Figure 3:
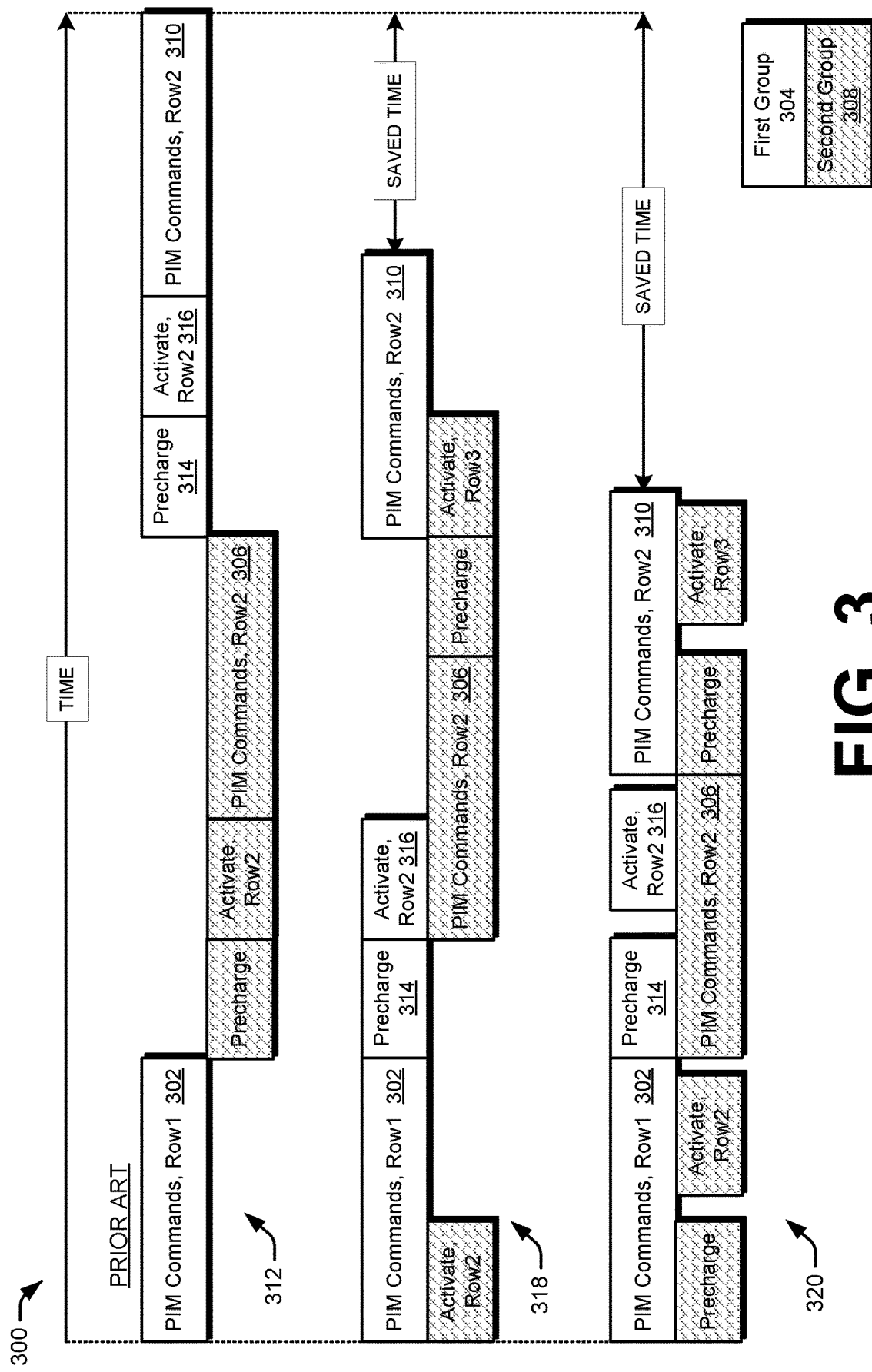
FIG. 3 depicts a non-limiting example showing an improvement in computational efficiency of the described techniques over conventional techniques.

FIG. 3 depicts a non-limiting example 300 showing an improvement in computational efficiency of the described techniques over conventional techniques. The example 300 includes a plurality of PIM commands that are issued in the following order: (1) a first stream of PIM commands 302 which access a first row of banks in a first group 304, (2) a second stream of PIM commands 306 which access a first row of banks in a second group 308, and (3) a third stream of PIM commands 310 which access a second row of banks in the first group 304. Further, a variety of DRAM commands are issued in order to execute the PIM commands 302, 306, 310.

In a prior art example 312, a conventional memory controller waits for PIM execution time to complete in one group of banks before issuing DRAM commands that are utilized to execute the PIM commands in another group of banks. For example, in order to execute the PIM commands 310 that access the second row of the first group 304 of banks, the conventional memory controller first waits for one or more PIM components to finish executing the PIM commands 306 that access the second row of the second group 308 of banks. Then, the conventional memory controller issues the precharge command 314 to close a previously opened row (e.g., the first row) in the first group 304 of banks and an activate command 316 to open the row (e.g., the second row) in the first group 304 of banks that is accessed by the PIM commands 310. Notably, the row precharge overhead time and the row activate overhead time for the precharge command 314 and the activate command 316, respectively, are not overlapped with execution of PIM commands that access a different group of banks. In other words, banks in the first group 304 sit idle (e.g., without servicing memory commands) while banks in the second group 308 service memory commands, and vice versa.

Example 318 illustrates an order in which the memory controller 110 issues the PIM commands 302, 306, 310 and the DRAM commands that are utilized to execute the PIM commands in accordance with the described techniques. Specifically, example 318 illustrates how the memory controller 110 schedules the DRAM commands in accordance with the non-interleaved scheduling policy. For example, an identification command that identifies the second row of the first group 304 of banks is enqueued in the PIM queue after the PIM commands 302 that access the first row of the first group 304 of banks. Based on the identification command, the memory controller 110 first issues the precharge command 314 to close the first row of the first group 304 of banks immediately after the PIM commands 302 are executed. Then, the memory controller 110 issues the activate command 316 to open the second row in the first group 304 of banks in parallel with execution of the PIM commands 306 that access the second group of banks. Notably, the DRAM commands are scheduled in a similar manner to that illustrated in example 318 for implementations in which the memory controller 110 schedules the DRAM commands based on an inspection of enqueued PIM commands and/or a prediction policy rather than the identification commands 204.

Example 320 illustrates an order in which the memory controller 110 issues the PIM commands 302, 306, 310 and the DRAM commands that are utilized to execute the PIM commands in accordance with the described techniques. In particular, example 320 illustrates how the memory controller 110 schedules the DRAM commands in accordance with the interleaved scheduling policy. For example, an identification command that identifies the second row of the first group 304 of banks is enqueued in the PIM queue after the PIM commands 302 that access the first row of the first group 304 of banks. Based on the identification command, the memory controller 110 first issues the precharge command 314 to close the first row of the first group 304 of banks immediately after the PIM commands 302 are executed. As shown, the precharge command 314 is scheduled to be serviced in parallel with execution of a first portion of the PIM commands 306 that access the second group 308 of banks. After the row precharge overhead time has passed, the memory controller 110 issues the activate command 316 to open the second row in the first group 304 of banks in parallel with execution of a second portion of the PIM commands 306 that access the second group 308 of banks.

Thus, in example 318, the memory controller 110 overlaps row activate overhead time in one group of banks with execution of PIM commands that access a different group of banks. Further, in example 320, the memory controller 110 overlaps row activate overhead time and row precharge overhead time in one group of banks with execution of PIM commands that access a different group of banks. By doing so, the described techniques enable processing of the PIM commands 302, 306, 310 in a shorter amount of time, as compared to the prior art example 312, leading to increased computational efficiency and improved PIM throughput.

FIG. 4 depicts a procedure 400 in an example implementation showing an order in which PIM commands are scheduled and transmitted to a memory controller in accordance with the described techniques. In the procedure 400, a program is compiled to generate a plurality of commands for execution by a processing in memory component embedded in a memory, the memory including a first group of banks and a second group of banks (block 402). By way of example, the compiler 106 compiles a program to generate a plurality of PIM commands 122 for execution by the PIM component(s) 120 embedded in the memory module 104. The memory module 104, for instance, includes a memory 112 organized into a plurality of blocks 114 that each include a bank (e.g., the first bank 116) assigned to a first group 304, a bank (e.g., the second bank 118) assigned to a second group 308, and a respective processing in memory component 120.

A first stream of commands which cause the processing in memory component to perform operations that access the first group of banks are transmitted to a memory controller (block 404). For example, the core 108 of the host 102 transmits, to the memory controller 110, a first stream of the PIM commands 122 which cause the PIM component 120 to perform operations that access the first group 304 of banks.

An identification command is transmitted to the memory controller that identifies a next row of the first group of banks that is to be accessed by the processing in memory component (block 406). For example, the core 108 of the host 102 transmits, to the memory controller 110, an identification command 204 which identifies a next row of the first group 304 of banks that is to be accessed by the PIM component 120. In one or more implementations, the compiler 106 inserts the identification command 204 after the first stream of PIM commands 122 that access the first group 304 of banks. In accordance with the described techniques, the identification command 204 instructs the memory controller 110 to schedule an activate command 218 to open the next row in the first group 304 of banks in parallel with execution of a subsequent stream of PIM commands that access the second group 308 of banks. Additionally or alternatively, the identification command 204 instructs the memory controller 110 to schedule a precharge command 216 to close a previously opened row in the first group 304 of banks in parallel with execution of a subsequent stream of PIM commands that access the second group 308 of banks.

A second stream of commands which cause the processing in memory component to perform operations that access the second group of banks are transmitted to the memory controller (block 408). For example, the core 108 of the host 102 transmits, to the memory controller 110, a second stream of PIM commands 122 which cause the PIM component 120 to perform operations that access the second group 308 of banks. In one or more implementations, the compiler 106 determines a number of PIM commands to include in the first stream of PIM commands and the second stream of PIM commands based on timing constraints associated with the PIM commands 122 and DRAM commands. By way of example, the compiler 106 determines to include a sufficient number of PIM commands 122 in the first stream and the second stream so that the PIM commands 122 in each stream have a combined execution time that is equal to or greater than the row precharge overhead time and the row activate overhead time. In this way, the PIM component 120 can execute the first stream of PIM commands 122 that access the first group 304 of banks for long enough to hide the overhead for closing a row and opening a new row in the second group 308 of banks, and vice versa.

Figure 5:
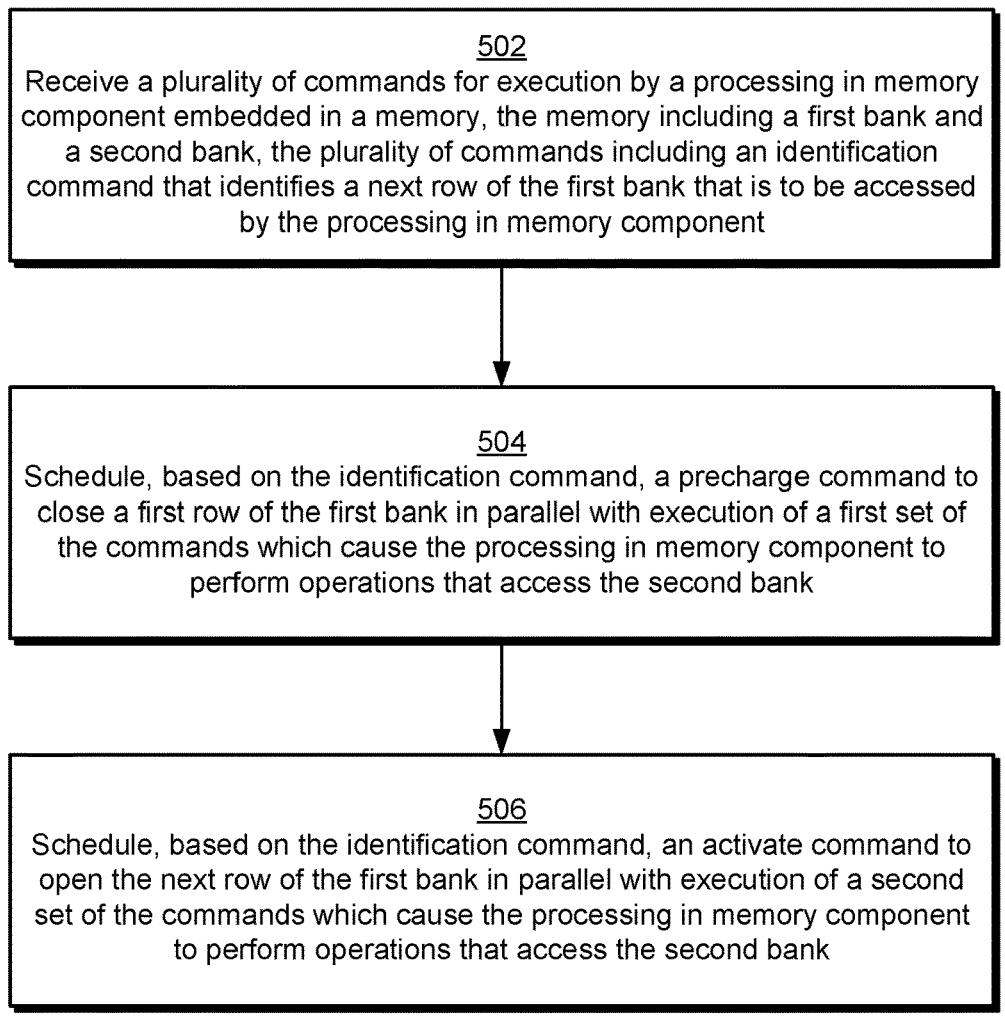
FIG. 5 depicts a procedure in an example implementation of scheduling a precharge command and an activate command to enable bank-level parallelism in accordance with the described techniques.

FIG. 5 depicts a procedure 500 in an example implementation of scheduling a precharge command and an activate command to enable bank-level parallelism in accordance with the described techniques. In the procedure 500, a plurality of commands are received for execution by a processing in memory component embedded in a memory, the memory including a first bank and a second bank, the plurality of commands including an identification command that identifies a next row of the first bank that is to be accessed by the processing in memory component (block 502). For example, the memory controller 110 receives a plurality of PIM commands 122 for execution by the PIM component 120 embedded in the memory module 104. In one or more implementations, the memory module 104 includes a memory 112 that is organized into a plurality of blocks 114, each including a first bank 116 and a second bank 118. The plurality of PIM commands 122, for instance, include a first stream of PIM commands 122 which cause the PIM component 120 to perform operations that access a first row of the first bank 116, the identification command 204 which identifies the next row of the first bank 116 that is subsequently accessed by the PIM component 120, and a second stream of PIM commands 122 which cause the PIM component 120 to perform operations that access the second bank 118. Notably, the identification command 204 identifies a next row in the first bank 116 that is to be accessed by the PIM component 120 without causing the PIM component 120 to perform operations (e.g., load operations, store operations) that access the next row.

A precharge command is scheduled, based on the identification command, to close a first row of the first bank in parallel with execution of a first set of the commands which cause the processing in memory component to perform operations that access the second bank (block 504). For example, the identification command 204 instructs the memory controller 110 to schedule the precharge command 216 to close the first row of the first bank 116 in parallel with execution of a first set of PIM commands 122 that access the second bank 118. To do so, the memory controller 110 calculates a first set of the PIM commands 122 (e.g., PIM commands 206, 208) having a combined execution time that is equal to or greater than the row precharge overhead time. Further, the memory controller 110 schedules the precharge command 216 to close the first row of the first bank 116 in parallel with execution of the first set of PIM commands (e.g., PIM commands 206, 208) that access the second bank 118.

An activate command is scheduled, based on the identification command, to open the next row of the first bank in parallel with execution of a second set of the commands which cause the processing in memory component to perform operations that access the second bank (block 506). For example, the identification command 204 instructs the memory controller 110 to schedule the activate command 218 to open the next row of the first bank 116 in parallel with execution of a second set of PIM commands 122 that access the second bank 118. To do so, the memory controller 110 schedules an activate command to open the next row of the first bank 116 that is included in the identification command 204 immediately after the determined first set of PIM commands (e.g., PIM commands 206, 208) are executed. Since the second stream of PIM commands includes a sufficient amount of PIM execution time to cover both row precharge overhead time and row activate overhead time, the next row of the first bank 116 is opened in parallel with a second set of PIM commands (e.g., PIM commands 210, 212) that access the second bank 118.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the host 102, the memory module 104, the compiler 106, the core 108, the memory controller 110, the memory 112, and the PIM component 120) are implemented in any of a variety of different manners such as hardware circuitry, software or firmware executing on a programmable processor, or any combination of two or more of hardware, software, and firmware. The methods provided are implemented in any of a variety of devices, such as a general-purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general-purpose computer or a processor. Examples of non-transitory computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A computing device comprising:
   a memory that includes a first bank and a second bank;
   a processing in memory circuit; and
   a memory controller to:
      receive a plurality of commands including a first stream of one or more commands that causes the processing in memory circuit to perform operations that access a first row of the first bank, and a second stream of one or more commands that causes the processing in memory circuit to perform operations that access the second bank; and
      schedule a precharge command to close the first row of the first bank and an activate command to open a next row of the first bank that is to be accessed by the processing in memory component after the first stream of one or more commands, the precharge command and the activate command scheduled to execute in parallel with execution of the second stream of one or more commands.

2. The computing device of claim 1, wherein the plurality of commands include an identification command that identifies the next row of the first bank, and the memory controller is configured to schedule the precharge command and the activate command based on the identification command.

3. The computing device of claim 1, wherein the memory is organized into a plurality of blocks, each block including a bank assigned to a first group, a bank assigned to a second group, and a respective processing in memory circuit shared among the banks included in a respective block.

4. The computing device of claim 3, wherein the first bank is assigned to the first group, the second bank is assigned to the second group, and the processing in memory circuit is shared among the first bank and the second bank.

5. The computing device of claim 3, wherein the activate command causes banks assigned to the first group to open the next row in parallel, and the second stream of one or more commands causes multiple processing in memory circuits to perform operations that access banks assigned to the second group in parallel.

6. The computing device of claim 1, wherein the memory controller is further configured to schedule the activate command to open the next row based on an inspection of rows accessed by the plurality of commands.

7. The computing device of claim 1, wherein the memory controller is further configured to predict, using a prediction policy, the next row of the first bank to be accessed by the processing in memory circuit based on access patterns of previously issued processing in memory commands, and schedule the activate command to open the next row based on the prediction.

8. The computing device of claim 7, wherein the memory controller is further configured to update the prediction policy based on whether a row of the first bank that is opened based on the prediction is a row of the first bank that is accessed next by the processing in memory circuit.

9. The computing device of claim 7, wherein the memory controller is further configured to:
   receive one or more hints indicative of at least one of: an amount of data that is to be processed by the processing in memory circuit in executing the plurality of commands or a number of data structures involved in the plurality of commands; and predict the next row of the first bank to be accessed by the processing in memory circuit based on the one or more hints.

10. The computing device of claim 1, wherein the precharge command is scheduled to close the first row of the first bank in parallel with execution of a first set of the second stream of one or more commands having a combined execution time that is equal to or greater than an overhead time for closing a row of the memory.

11. The computing device of claim 10, wherein the activate command is scheduled after the first set of the second stream of one or more commands to open the next row in parallel with execution of a second set of the second stream of one or more commands by the processing in memory circuit.

12. A system comprising;
a memory that includes a first group of banks and a second group of banks;
multiple processing in memory circuits; and
a processor to:
receive a first stream of one or more commands that causes the multiple processing in memory circuits to perform operations that access the first group of banks in parallel, and a second stream of one or more commands that causes the multiple processing in memory circuits to perform operations that access the second group of banks in parallel; and
schedule an activate command that causes the first group of banks to open a next row of the first group of banks that is to be accessed by the multiple processing in memory circuits after the first stream of commands in parallel, the activate command scheduled to execute in parallel with execution of the second stream of one or more commands.

13. The system of claim 12, wherein the processor is further configured to receive an identification command that identifies the next row of the first group of banks, and schedule the activate command based on the identification command.

14. The system of claim 12, wherein the memory is organized into a plurality of blocks, each including a bank assigned to the first group, a bank assigned to the second group, and a processing in memory circuit shared among the banks in a respective block.

15. The system of claim 12, wherein the processor is further configured to schedule a precharge command to close a first row of the first group of banks that is accessed by the first stream of one or more commands, the precharge command scheduled to execute in parallel with execution of the second stream of one or more commands.

16. The system of claim 12, wherein the processor is configured to:
predict, using a prediction policy, the next row of the first group of banks to be accessed by the multiple processing in memory circuits; and
update the prediction policy based on whether a row of the first group of banks that is opened based on the prediction is a row of the first group of banks that is accessed next by the multiple processing in memory circuits.

17. A method comprising:
receiving a first stream of commands that causes a processing in memory circuit to access a first bank of a memory, a second stream of commands that causes the processing in memory circuit to access a second bank of the memory, and an identification command ordered before the second stream of commands that identifies a next row of the first bank to be accessed by the processing in memory circuit after the second stream of one or more commands; and
scheduling an activate command to open the next row of the first bank in parallel with execution of the second stream of one or more commands.

18. The method of claim 17, further comprising scheduling a precharge command to close a first row of the first bank that is accessed by the first stream of one or more commands in parallel with execution of the second stream of one or more commands.

19. The method of claim 18, further comprising scheduling one or more commands of the second stream of one or more commands after the precharge command and before the activate command, the one or more commands having a combined execution time that is greater than or equal to an overhead time for closing a row of the memory.

20. The method of claim 17, wherein the identification command identifies the next row of the first bank without causing data to be read from or written to the next row.

* * * * *